US012636986B2

(12) United States Patent
Bhattad

(10) Patent No.: US 12,636,986 B2
(45) Date of Patent: May 26, 2026

(54) AIR DEFLECTOR

(71) Applicant: Lear Corporation, Southfield, MI (US)

(72) Inventor: Jaykumar Bhattad, Pune (IN)

(73) Assignee: Lear Corporation, Southfield, MI (US)

( * ) Notice: Subject to any disclaimer, the term of this patent is extended or adjusted under 35 U.S.C. 154(b) by 221 days.

(21) Appl. No.: 18/376,705

(22) Filed: Oct. 4, 2023

(65) Prior Publication Data

US 2024/0174142 A1    May 30, 2024

(30) Foreign Application Priority Data

Nov. 30, 2022    (IN) .............................. 202241068999

(51) Int. Cl.
B60N 2/56        (2006.01)
F24F 13/08        (2006.01)

(52) U.S. Cl.
CPC ............ B60N 2/5621 (2013.01); F24F 13/08 (2013.01)

(58) Field of Classification Search
CPC ...... B60N 2/5621; B60N 2/5657; F24F 13/08
See application file for complete search history.

(56) References Cited

U.S. PATENT DOCUMENTS

| | | | | |
|---|---|---|---|---|
| 2,565,555 A | * | 8/1951 | Goldberg | ........... B60K 15/0406 |
| | | | | 220/88.1 |
| 2,655,857 A | * | 10/1953 | Broberg | ............... F24F 13/075 |
| | | | | 454/309 |
| 2,784,659 A | | 3/1957 | De Roo | |
| 4,911,066 A | * | 3/1990 | Carew | ...................... F24F 13/08 |
| | | | | 52/473 |
| 7,862,113 B2 | * | 1/2011 | Knoll | ................... B60N 2/5657 |
| | | | | 297/180.13 |
| 10,406,950 B2 | | 9/2019 | Yang | |
| 10,967,767 B2 | | 4/2021 | Yang | |
| 11,420,544 B2 | * | 8/2022 | Kim | ...................... F04D 29/422 |
| 2015/0329027 A1 | * | 11/2015 | Axakov | ............... B60N 2/5621 |
| | | | | 297/180.13 |
| 2017/0108234 A1 | * | 4/2017 | Lee | .......................... F24F 13/24 |
| 2017/0356673 A1 | * | 12/2017 | Gauss | ................... F04D 29/703 |
| 2020/0284466 A1 | * | 9/2020 | Bjørn | ...................... F24F 13/08 |
| 2022/0176855 A1 | * | 6/2022 | Pfaff | ...................... B60N 2/879 |
| 2022/0371486 A1 | * | 11/2022 | Cluet | ...................... B60N 2/70 |

FOREIGN PATENT DOCUMENTS

| | | |
|---|---|---|
| GB | 509287 A | 7/1939 |
| JP | 2013119345 A | 6/2013 |
| JP | 2018522193 A | 8/2018 |
| WO | 2017011990 A1 | 1/2017 |
| WO | 2022044586 A1 | 3/2022 |

OTHER PUBLICATIONS

Japan Notice of Reasons for Refusal, JP2023-202302, dated Apr. 30, 2025 (w_translation).

* cited by examiner

*Primary Examiner* — David R Dunn

(57) ABSTRACT

An air deflector may include a base, an aperture extending through the base, and/or a plurality of fins extending across the aperture. The fins are fixed relative to the base. The plurality of fins include at least three fins. A vehicle seat may include an air deflector, an air mover, a duct connected to the air mover and a tube portion of the air deflector, and an air distributor in fluid communication with the aperture.

20 Claims, 15 Drawing Sheets

AIR DEFLECTOR

CROSS-REFERENCE TO RELATED APPLICATION

This application claims priority to Indian Provisional Patent Application No. 202241068999, filed on Nov. 30, 2022, the contents of which is hereby incorporated by reference in its entirety.

TECHNICAL FIELD

The present disclosure generally relates to air deflectors, including air deflectors that may be used in connection with vehicle seats.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
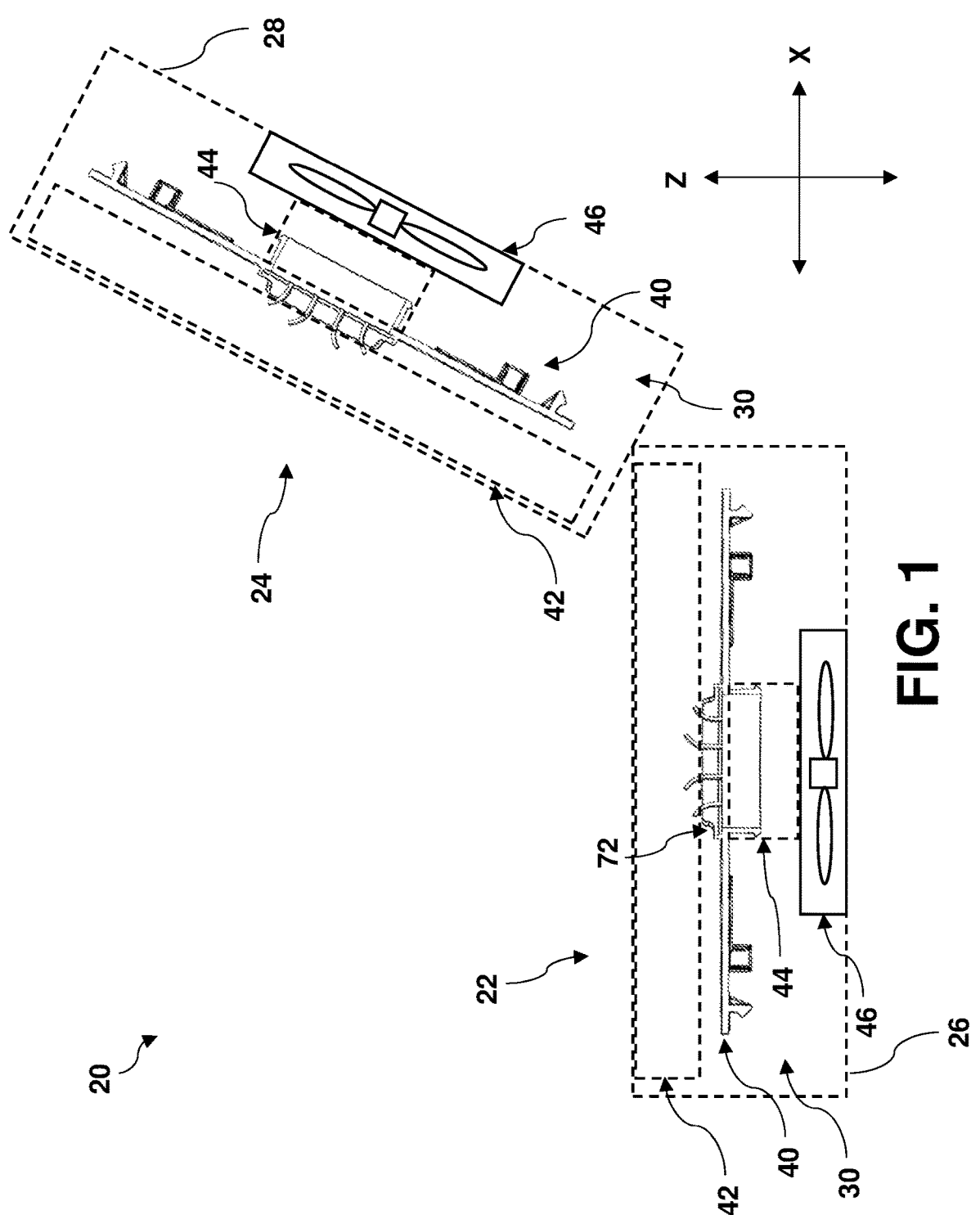
FIG. 1 is a side view generally illustrating an embodiment of a vehicle seat according to teachings of the present disclosure.
Figure 2:
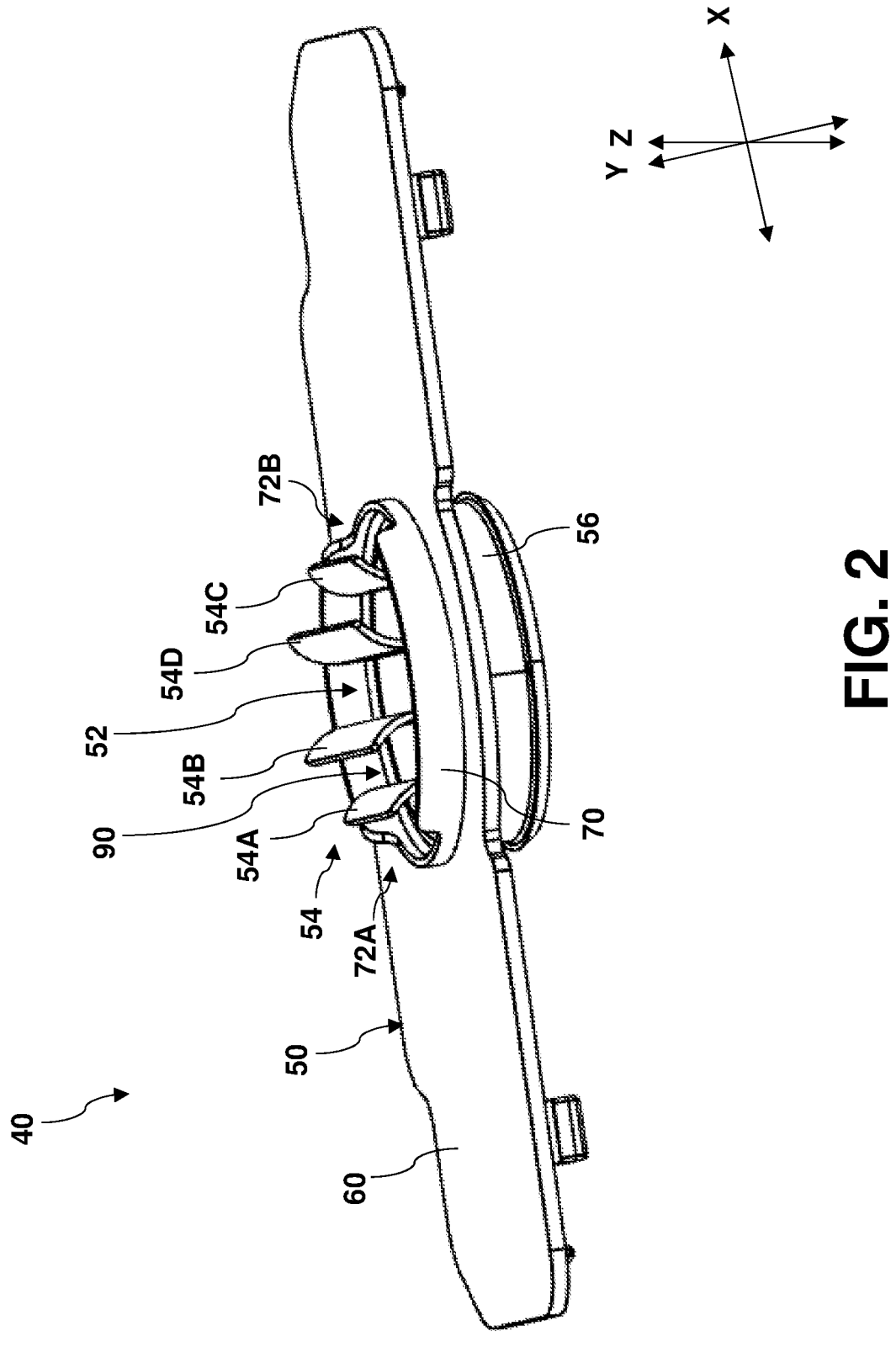
FIGS. 2 and 3 are a perspective views generally illustrating an embodiment of an air deflector according to teachings of the present disclosure.
Figure 3:
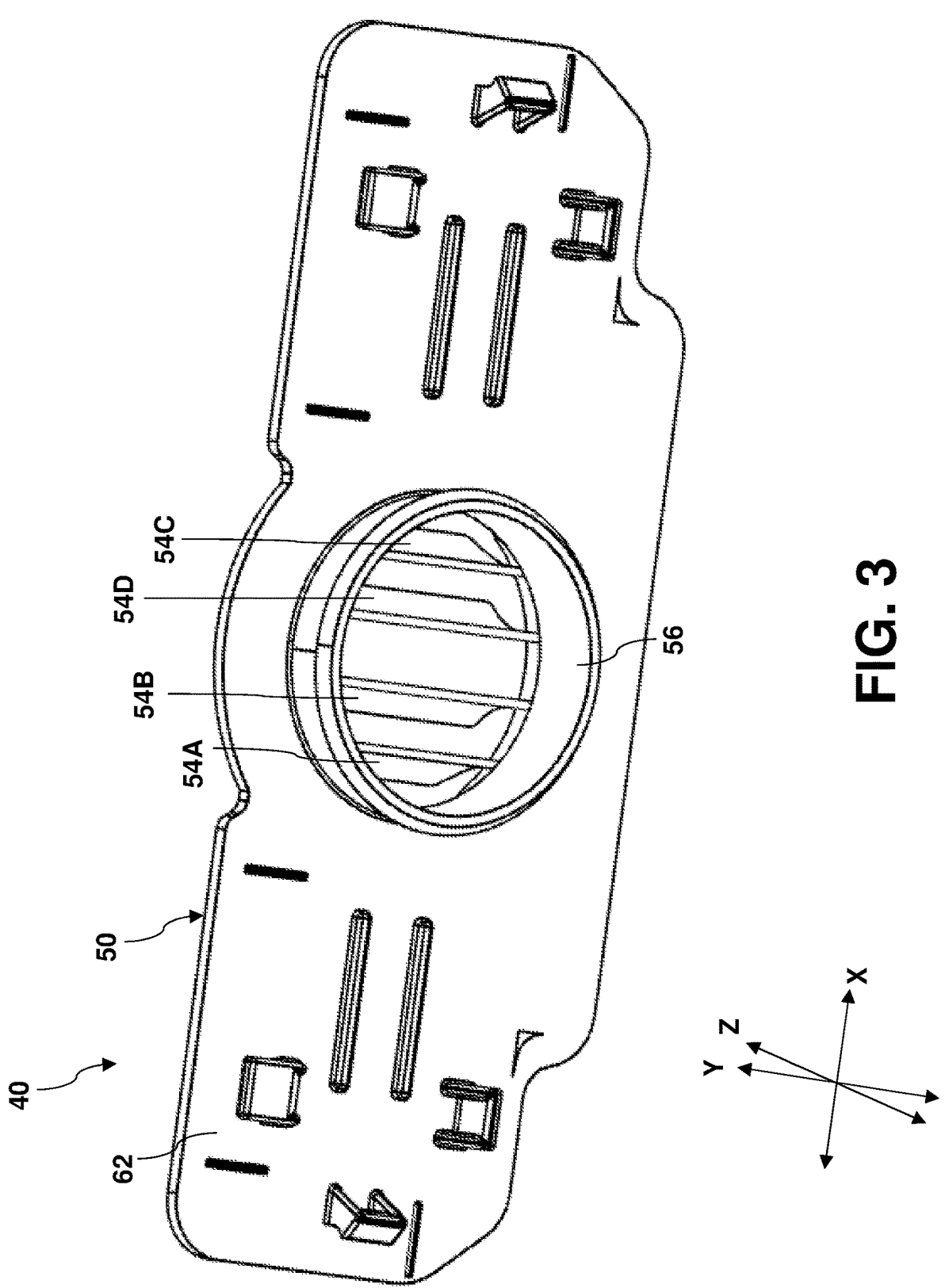
Figure 4:
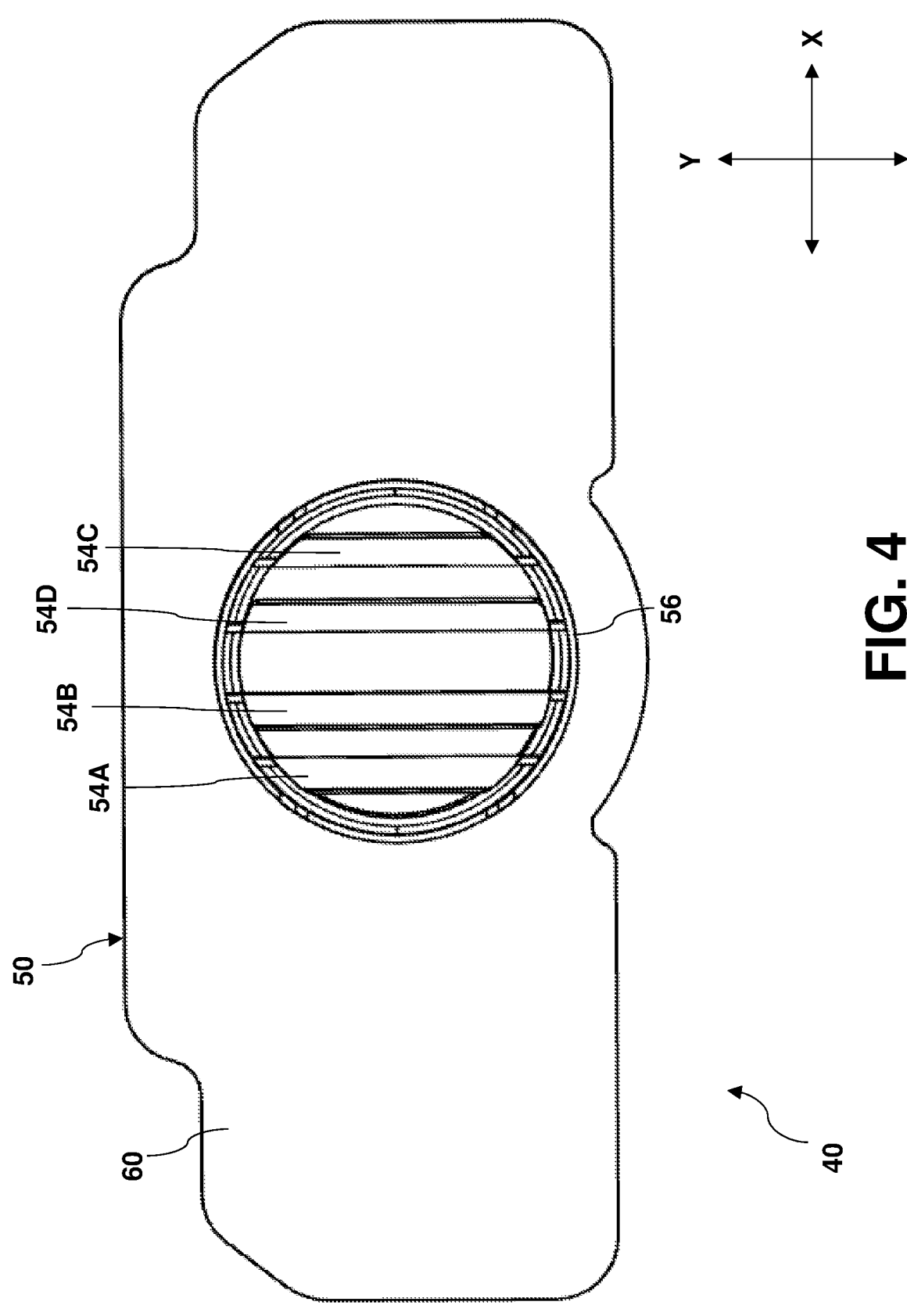
FIGS. 4 and 5 are top and bottom views, respectively, generally illustrating an embodiment of an air deflector according to teachings of the present disclosure.
Figure 5:
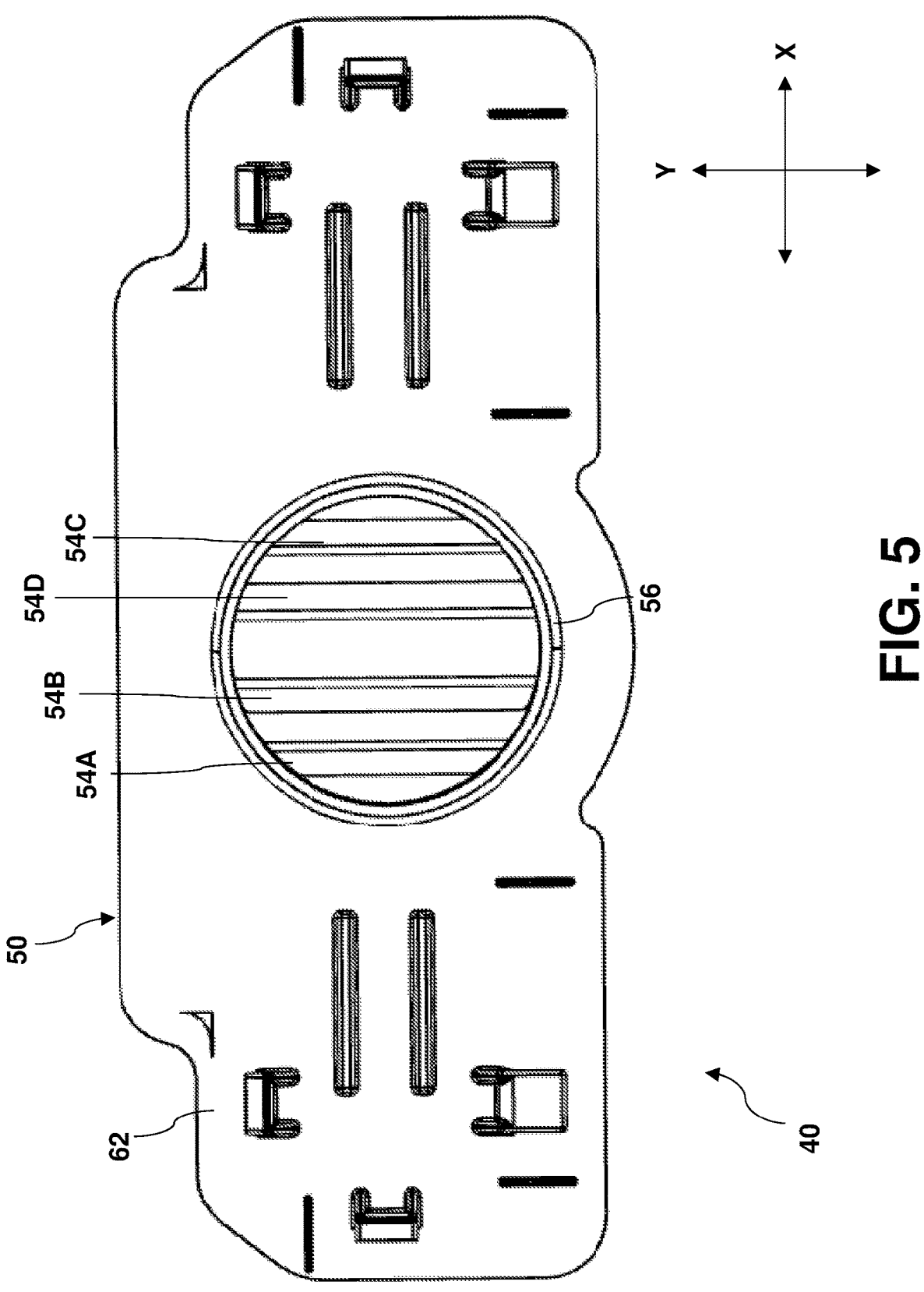
Figure 6:
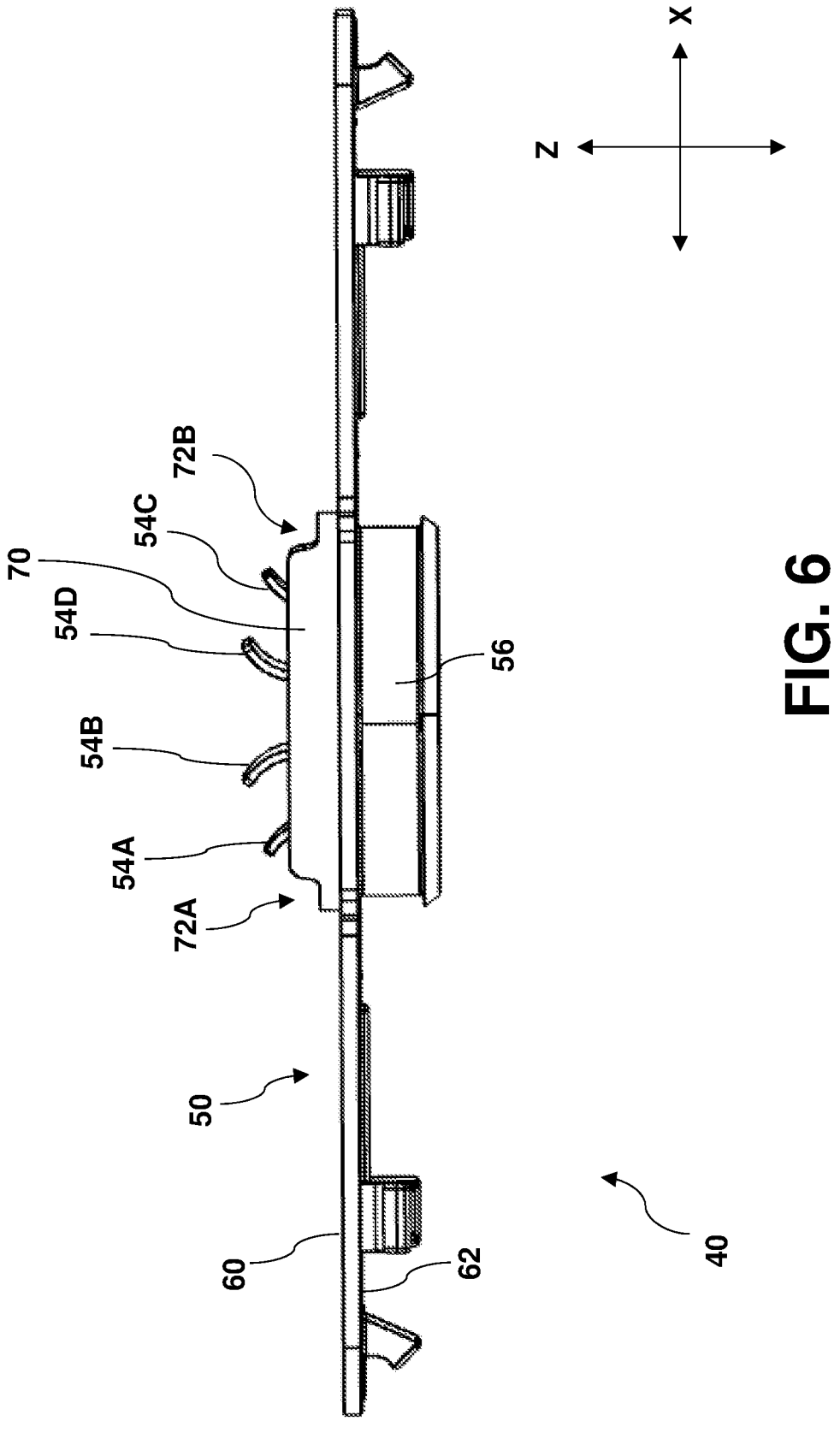
FIG. 6 is a side view generally illustrating an embodiment of an air deflector according to teachings of the present disclosure.

As generally illustrated in FIG. 1, an embodiment of a seat 20 (e.g., a vehicle seat) includes a seat base 22 and a seat back 24 that may be connected to the seat base 22. The seat base 22 includes a seat base cushion 26. The seat back 24 includes a seat back cushion 28. At least one of the seat base 22 or the seat back 24 includes an air distribution assembly 30. The air distribution assembly 30 includes a bracket 40, an air distributor 42, a duct 44, and an air mover 46 (e.g., a fan, a pump, among others). The duct 44 connects the air mover 46 with the bracket 40, and the bracket 40 connects the duct 44 and the air mover 46 with the air distributor 42 such that the air mover 46 is in fluid communication with the air distributor 42. When the air mover 46 is actuated, the air mover 46 pushes air through the duct 44, through the bracket 40, and into the air distributor 42. The air distributor 42 (e.g., an air distribution mat, ventilation bag, etc.) may provide the air to the surface of a cushion 26, 28, such as to cool an occupant of the seat 20. Alternatively, the air mover 46 may be actuated in an opposite direction, and the air mover 46 may pull air into the cushion 26, 28, though the air distributor 42, through the bracket 40, and through the duct 44, such as to cool the occupant of the seat 20.

An embodiment of a bracket 40 is generally illustrated in FIGS. 2-7 and 9-14. The bracket 40 alters (e.g., deflects) the path of air flowing through the bracket 40, and may be referred to as an air deflector 40 or bracket 40. The bracket includes a base 50, an aperture 52, a plurality of fins 54, and/or a tube portion 56. The aperture 52 extends through the base 50. The plurality of fins 54 extend at least partially across the aperture 52 and are fixed relative to the base. In some embodiments, the plurality of fins 54 may include at least three fins, such as a first fin 54A, a second fin 54B, a third fin 54C, and a fourth fin 54D. With some configurations, the plurality of fins 54 may include the same or different lengths (e.g., in an axial or Z-direction) and/or the same or different widths (e.g., in a Y-direction). For example and without limitation, a second fin 54B may be longer than the first fin 54A, and/or a fourth fin 54D may be longer than the third fin 54C in the axial/Z-direction (see, e.g., FIGS. 6, 7, 13 and 14). The first fin 54A and the third fin 54C may be the same length, and/or the second fin 54B and the fourth fin 54D may be the same length. The first fin 54A and the third fin 54C may have the same width in the Y-direction, which may be less than the widths of the second fin 54B and the fourth fin 54D. The thicknesses of the fins 54 (e.g., in an X-direction) may be substantially the same. The second fin 54B and the fourth fin 54D may be disposed closer to the center/middle 52A of the aperture 52 than the first fin 54A and/or the third fin 54C. With circular configurations of the aperture 52, the first fin 54A may be disposed radially outward of the second fin 54B, and/or the third fin 54C may be disposed radially outward of the fourth fin 54D. In some configurations, the first and second fins 54A-B are disposed at a first half of the aperture 52 (e.g., the left half in FIGS. 7 and 14), and/or the third and fourth fins 54C-D are disposed at a second half of the aperture 52 (e.g., the right half in FIGS. 7 and 14). Optionally, the fins 54 are disposed (e.g., offset in an X-direction) such that they do not overlap with each other in the axial/Z-direction. Alternatively, the fins 54 are disposed such that at least two fins 54 overlap with each other in the axial/Z-direction. The fins 54 may be offset from the center 52A of the aperture 52 such that the fins 54 do not overlap with the center 52A of the aperture 52. For example, air that enters the center 52A of the aperture 52 may not be deflected by the fins 54.

In embodiments, at least one of the fins 54 is curved (see, e.g., FIGS. 2-8) and/or at least one of the fins 54 is angled (sec, e.g., FIGS. 9-15). A first set of the fins 54 may be angled or curved in a first direction and a second set of the fins 54 may be curved in a second/opposite direction, both of which may be away from a middle/center 52A of the aperture 52. For example and without limitation, with respect to FIGS. 7 and 14, first and second fins 54A-B may be angled/curved to the left, and/or third and fourth fins 54C-D may be angled/curved to the right.

With some embodiments, the fins 54 may include straight portions 80A-D and angled/curved portions 82A-D that may extend from the tops of the straight portions 80A-D. The straight portions 80A-D may be planar and may be perpendicular to a plane of the base 50. For example and without limitation, the base 50 may be generally parallel with an X-Y plane and the straight portions 80A-D may be parallel to a Y-Z plane and/or to each other. The angled/curved portions 82A-B of the first and second fins 54A-B may be parallel to each other. The angled curved portions 82C-D of the second and third fins 54C-D may be parallel to each other. The fins 54 may not intersect/cross with each other. The straight portions 80A, 80C of the shorter fins 54 may be shorter than the straight portions 80B, 80D of the longer fins 54. The angled/curved portions 82A-D may have generally the same lengths/extents.

Figure 7:
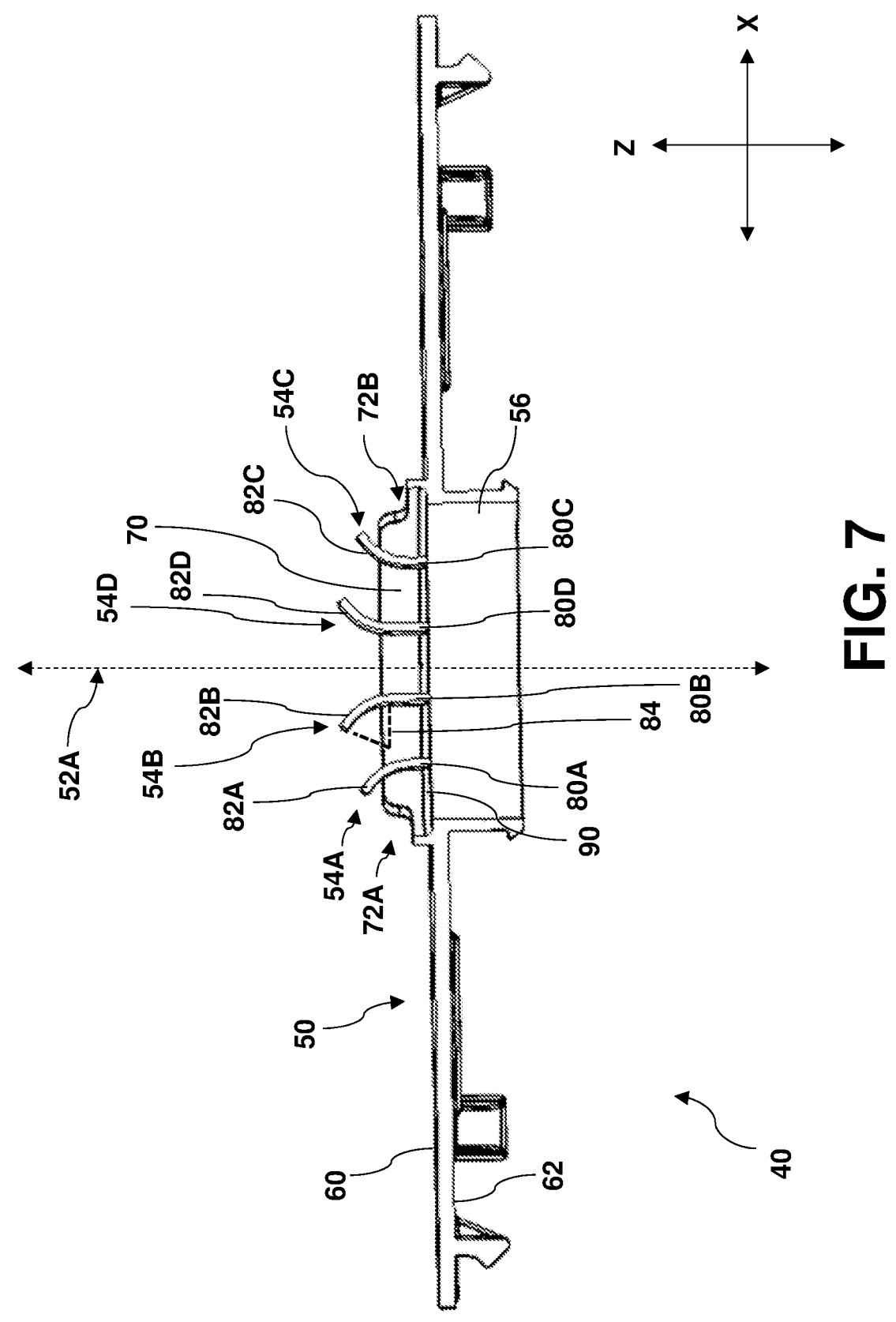
FIG. 7 is a cross-sectional view generally illustrating an embodiment of an air deflector according to teachings of the present disclosure.
Figure 14:
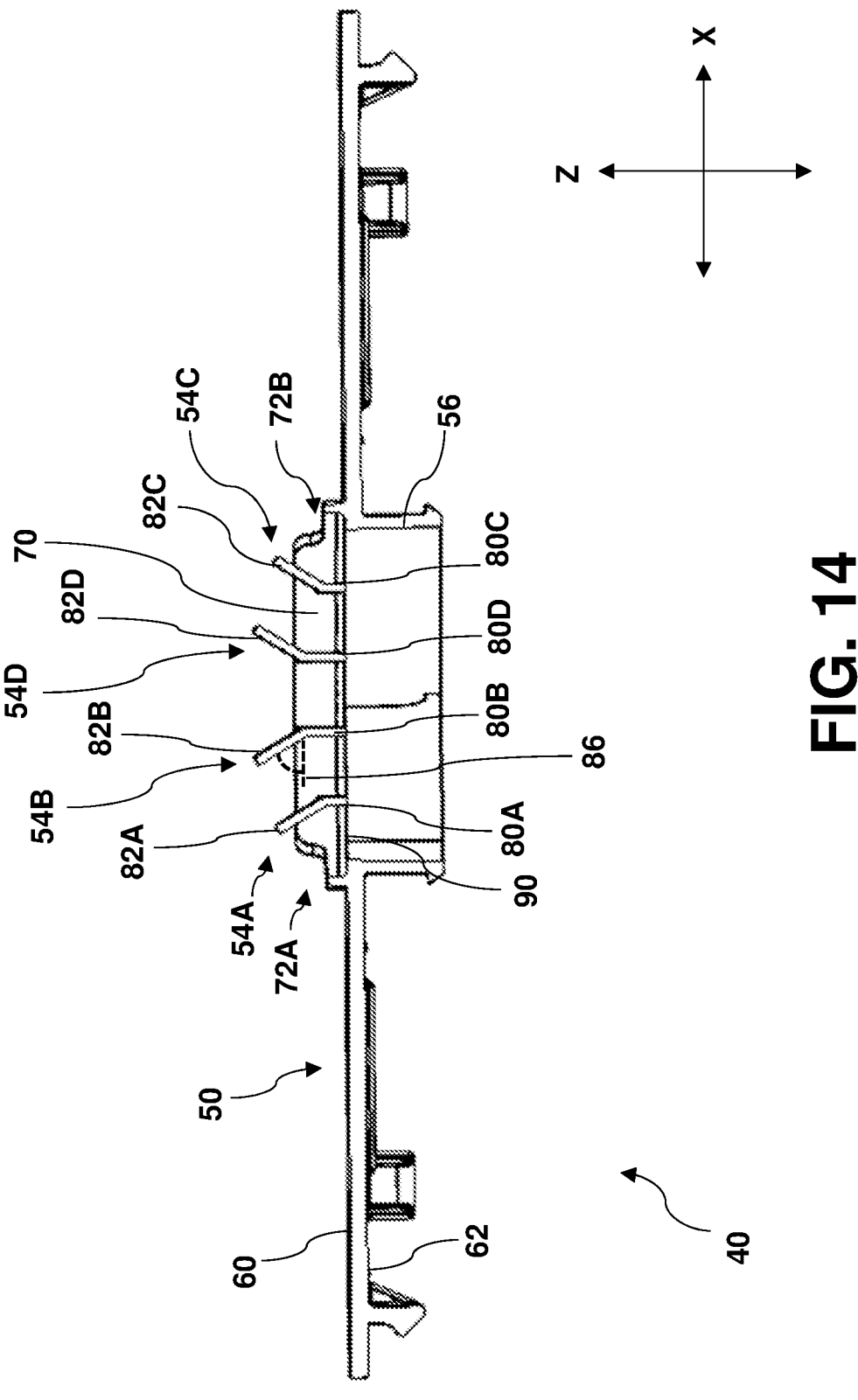
FIG. 14 is a cross-sectional view generally illustrating an embodiment of an air deflector according to teachings of the present disclosure.

In some embodiments, such as generally illustrated in FIGS. 7 and 14, the base 50 may include a lip 90 that provides an axial surface that is substantially aligned with a first side 60 of the base 50. The fins 54 may extend from the lip 90. For example and without limitation, a first end and a second end of the bottom edge of each fin 54 may be connected to respective portions of the lip 90. With a circular aperture 52, a cross section of the bracket 40 at the bottom edges of the fins 54 may generally show the straight portions 80A-D of the fin 54A-D as parallel chords of the aperture 52. Bottom edges of the fins 54 may be straight and/or continuous, and/or may be substantially aligned in the Z-direction with the first side 60 of the base 50.

With embodiments, circumferential extents 84 of curved portions 82A-D of fins 54 may be the same or different, and may be about 50-70 degrees, such as about 55-65 degrees and/or about 60 degrees. Additionally or alternatively, angles 86 of the angled portions 82A-D may be the same or different, and may be about 50-70 degrees, such as about 55-65 degrees and/or about 60 degrees relative to an X-Y plane.

As generally illustrated in FIGS. 7 and 14, the base 50 includes a first side 60 and a second side 62. The fins 54 are disposed at or beyond the first side 60. For example and without limitation, the fins 54 may be disposed at level relative to the Z-direction that is at or above the level of the first side 60 such that portions of the fins 54 are not disposed at or beyond the second side 62, and/or do not extend into and are not disposed in the tube portion 56.

As generally illustrated in FIGS. 2-7 and 9-14, the bracket 40 includes a tube portion 56 that extends from the second side 62 of the base 50 (e.g., opposite the fins 54). The tube portion 56 connects with a duct 44 to provide fluid communication between the bracket 40 and the duct 44 and/or the air mover 46 connected to the duct 44. A shape of the tube portion 56 corresponds to the shape of the aperture 52 and/or the shape of the duct 44. For example, with a circular aperture 52 and a cylindrical duct 44, the tube portion 56 may be cylindrical. With a polygonal aperture 52, the tube portion 56 may be polygonal. In some configurations, the tube portion 56 is inserted into the duct 44. In other configurations, the duct 44 is inserted into the tube portion 56.

As generally illustrated in FIGS. 2-7 and 9-14, the base includes a flange 70 that extends around some or all of the perimeter of the aperture 52. The flange 70 extends from the first side of the base 50 and may be parallel with at least some portions of one or more fins 54. In some configurations, the flange 70 is shorter in the Z-direction than some or all of the fins 54 such that some or all of the fins extend beyond the flange 70. The flange 70 may include one or more recesses 72 that correspond to sections of the flange 70 with a reduced length in the Z-direction. For example, the flange 70 may include a first recess 72A and a second recess 72B. The first recess 72A may be at least partially aligned in the Y-direction with the first fin 54A, such as to facilitate air flow out of and/or into the aperture 52 between the first fin 54A and the flange 70. The second recess 72B may be at least partially aligned in the Y-direction with the third fin 54C, such as to facilitate air flow out of and/or into the aperture 52 between the third fin 54C and the flange 70. The recesses 72A-B may be disposed opposite each other. With circular configurations, the circumferential extents of the recesses 72A-B may correspond to (e.g., result in a Y dimension that is about the same as) the width of the fins 54A, 54C in the Y-direction.

With some embodiments, a bracket 40 may be a monolithic (e.g., single, unitary) component. For example, the base 50, the fins 54, the tube portion 56, and/or the flange 70 may be formed together and/or at substantially the same time, such as via molding, additive manufacturing, and/or three-dimensional printing. A bracket 40 may comprise one or more of a variety of materials, such as one or more plastics, polymers, and/or metals.

Figure 8:
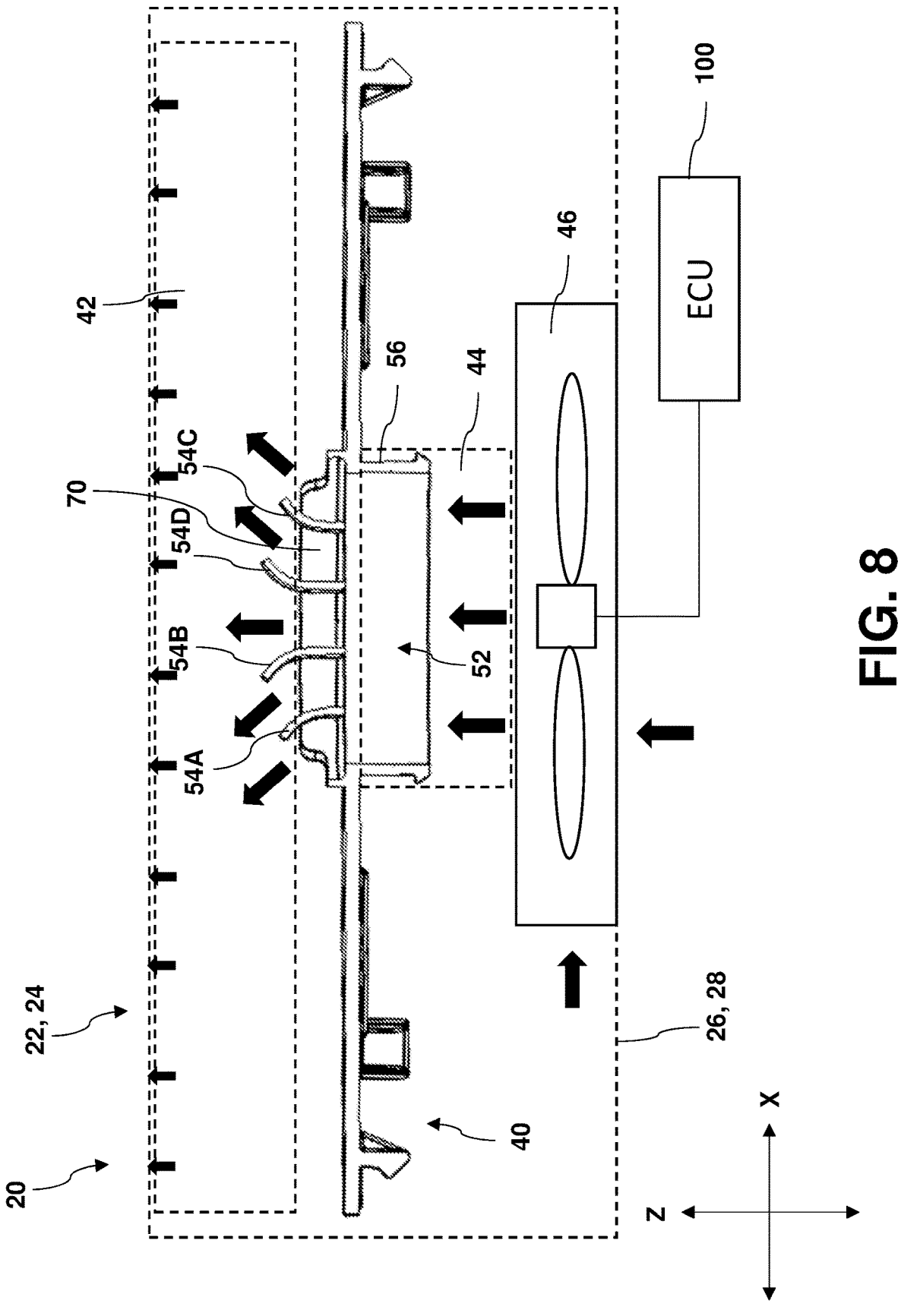
FIG. 8 is a cross-sectional view generally illustrating an embodiment of an air system according to teachings of the present disclosure.
Figure 9:
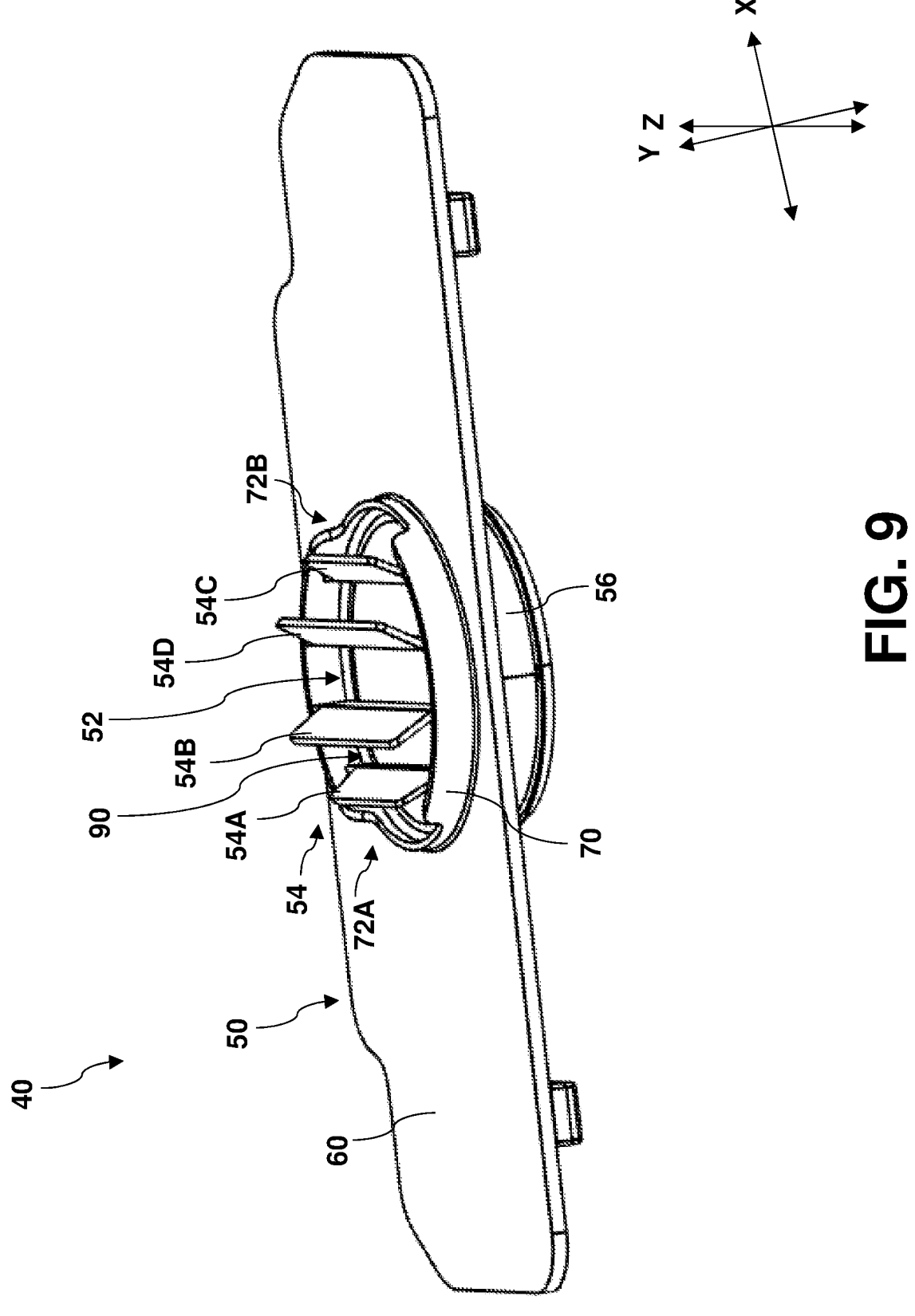
FIGS. 9 and 10 are a perspective views generally illustrating an embodiment of an air deflector according to teachings of the present disclosure.
Figure 10:
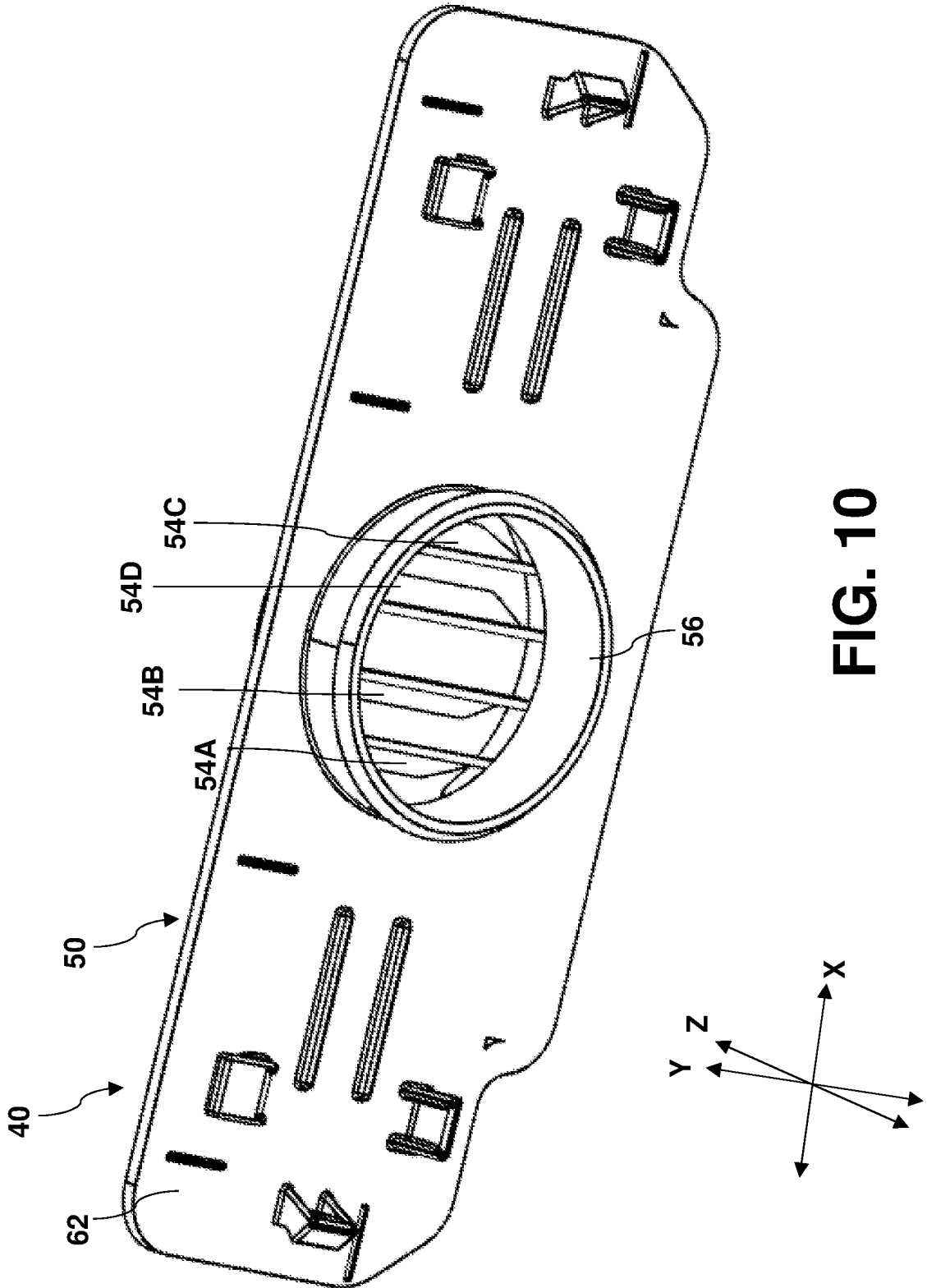
Figure 11:
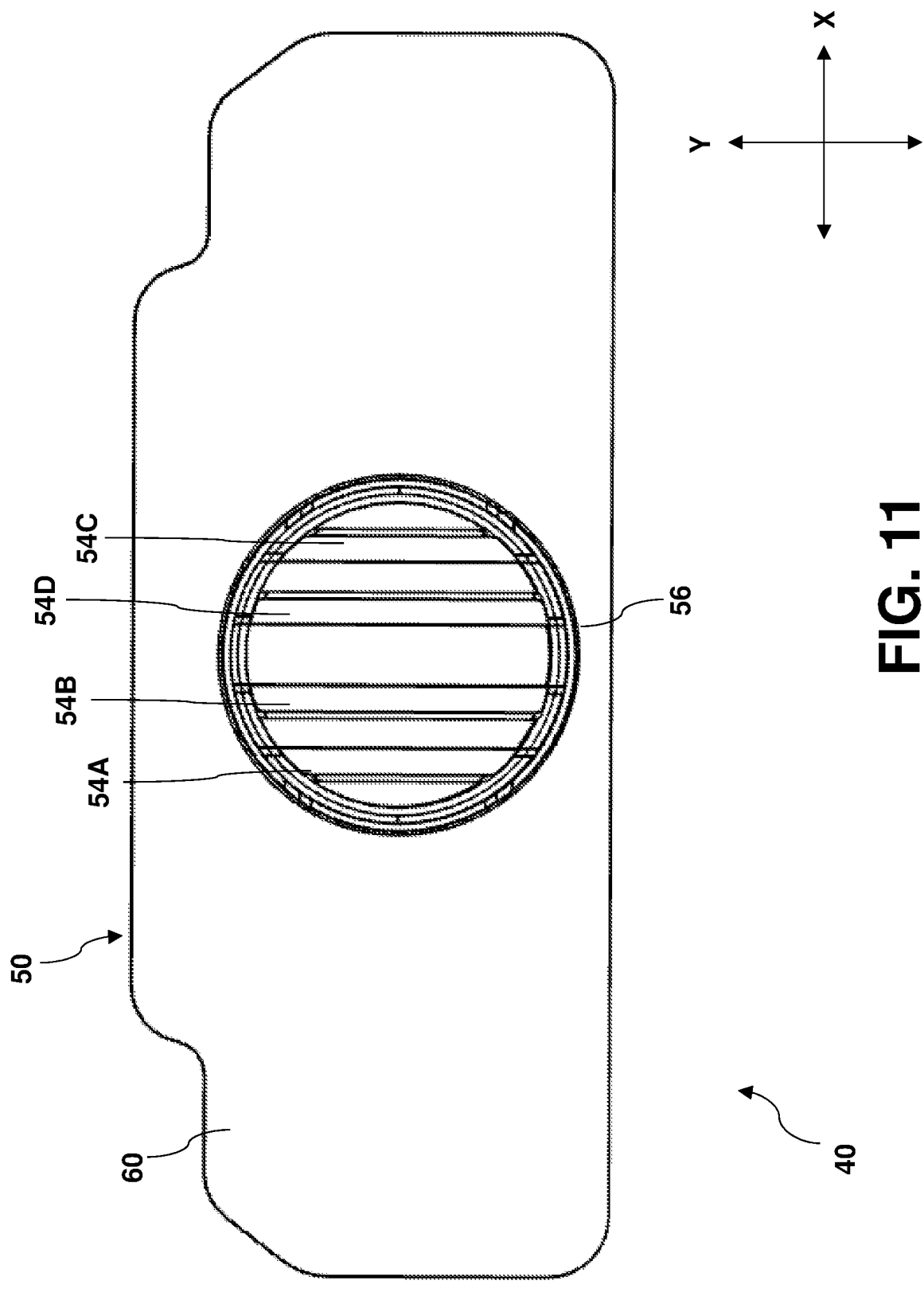
FIGS. 11 and 12 are top and bottom views, respectively, generally illustrating an embodiment of an air deflector according to teachings of the present disclosure.
Figure 12:
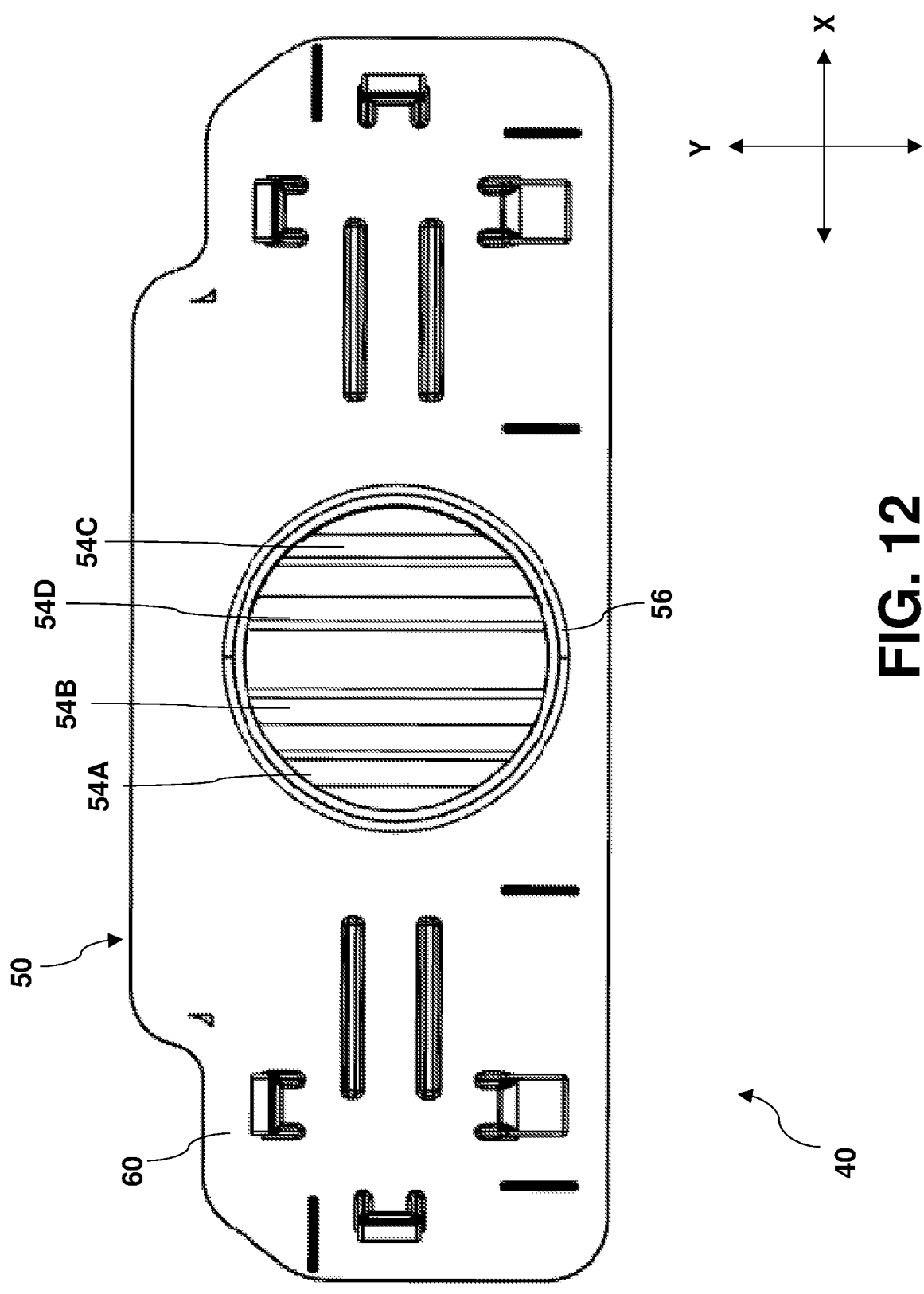
Figure 13:
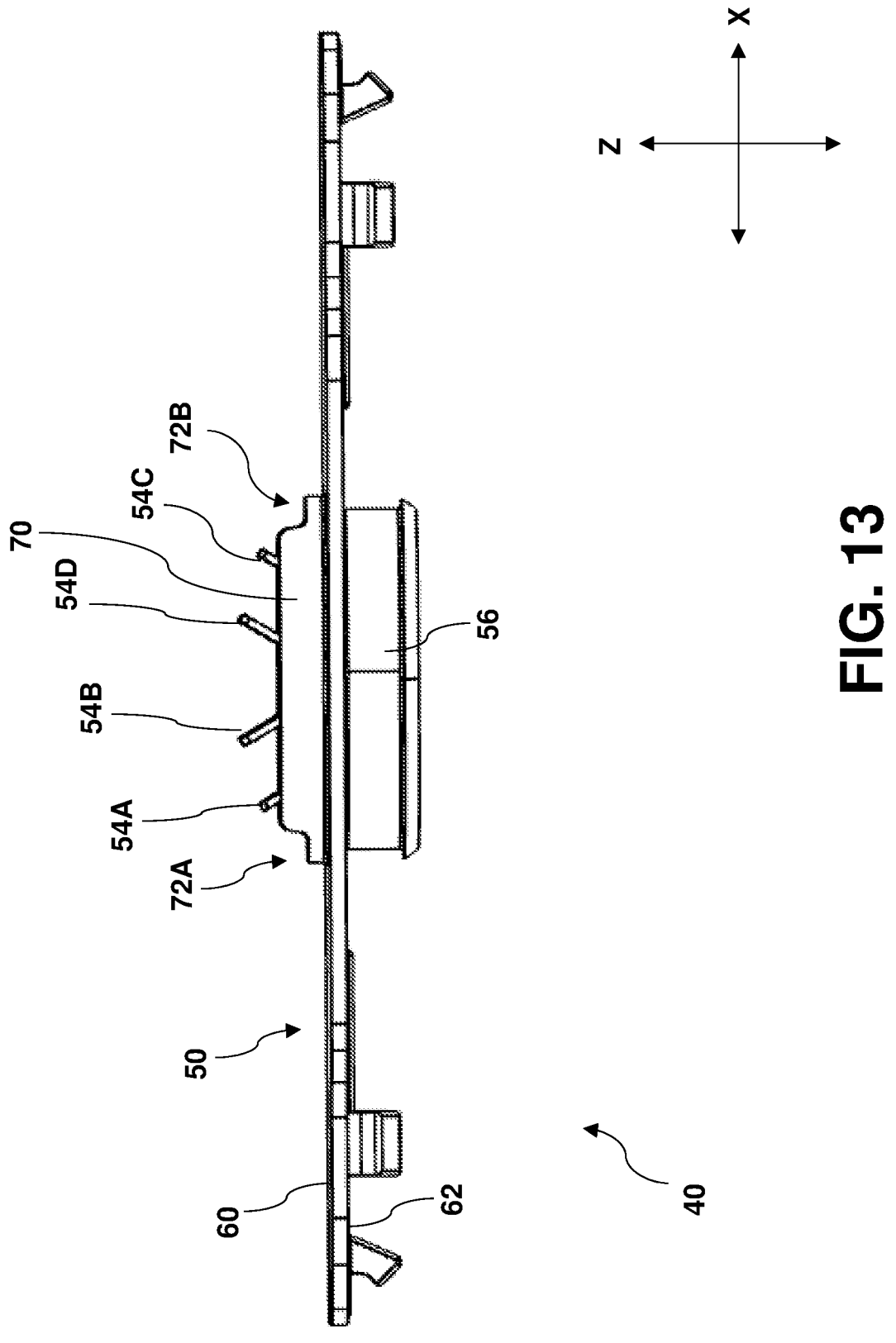
FIG. 13 is a side view generally illustrating an embodiment of an air deflector according to teachings of the present disclosure.
Figure 15:
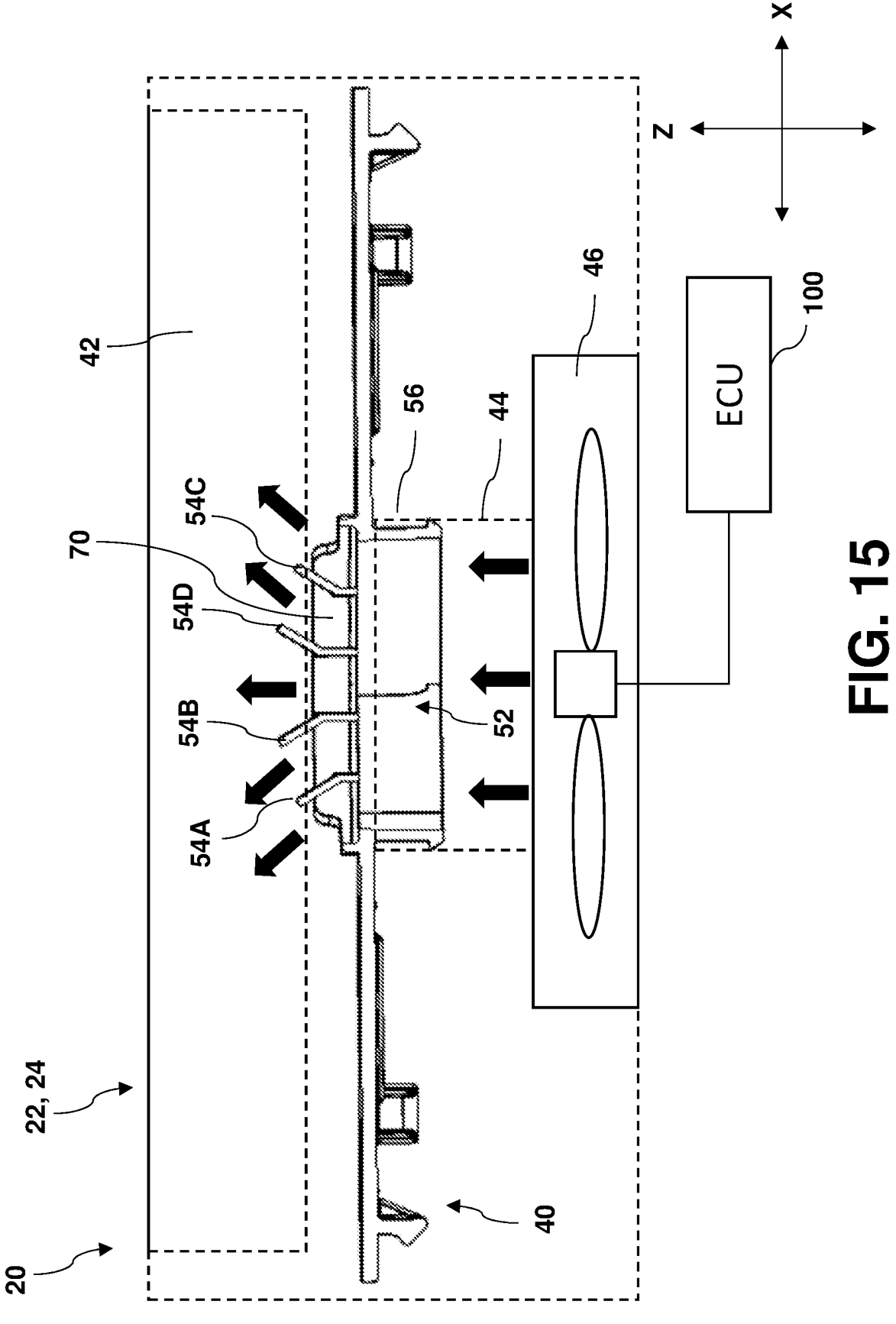
FIG. 15 is a cross-sectional view generally illustrating an embodiment of an air system according to teachings of the present disclosure.

As generally illustrated in FIGS. 8 and 15, a vehicle seat 20 and/or an air distribution assembly 30 includes a bracket 40 connected between an air mover 46 and an air distributor 42. The bracket 40 is connected to the air mover 46 via a duct 44 that may be formed integrally with or separate from the air mover 46. The duct 44 provides fluid communication between the air mover 46 and the bracket 40. When the air mover 46 is actuated in a first direction, the air mover 46 push air into the duct 44 and into the tube portion 56 of the bracket 40. When the air reaches the fins 54, the fins 54 deflect the air to more evenly distribute the air into the air distributor 42, which may render the air distributor 42 more effective and/or result in more even flow of air from the air distributor 42 to the surface of the cushion 26, 28.

With some embodiments, in a connected/assembled configuration, such as generally illustrated in FIGS. 8 and 15, a flange 70 of the bracket 40 may not extend into the air distributor 42 and/or there be at least some separation in the Z-direction between a top edge of the flange 70 and the air distributor 42. The fins 54 may extend beyond the flange and at partially into the air distributor 42. The fins 54 may be the only portion of the bracket 40 that extends into the air distributor 42. Longer fins, such as second and fourth fins 54B, 54D may extend farther into the air distributor 42 than shorter fins, such as first and third fins 54A, 54C.

With embodiments, an electronic control unit (ECU) 100 may be connected to the air mover 46 and may be configured to control operation/actuation of the air mover 46, such as in response to input from an occupant.

A method of operating an air distribution assembly 30 may include actuating, via an ECU 100, an air mover 46 to push air into a bracket 40, which may include pushing air through a duct 44 and into a tube portion 56 of the bracket 40. The air may be pushed through the bracket 40 such that the air flows to a plurality of fins 54. The method may include altering/deflecting the flow of at least some of the air via the fins 54 as the air flows out of the bracket 40 and into an air distributor 42. Deflecting the flow of the air may facilitate flow of the air within the air distributor 42. For example, instead of all or most of the air entering the air distributor 42 in a direction perpendicular to the air distributor 42 (e.g. in the Z-direction), some of the air will enter the air distributor at an oblique angle (e.g., corresponding to an angle or curvature of the fins 54) that may facilitate flow of air to or toward distal portions of the air distributor 42, which may improve air flow at the surface of a seat cushion 26, 28, which may improve occupant cooling and/or comfort.

Referring again to FIGS. 8 and 15, an air distribution assembly 30 may be disposed partially or entirely in a cushion 26, 28 of a seat base 22 or seat back 24. In some configurations, an air mover 46 is disposed in the cushion 26, 28. In other configurations, the air mover 46 is disposed outside of the cushion 26, 28.

Referring again to FIG. 1, a vehicle seat may include a first air distribution assembly 30 that is connected to and/or integrated with a seat base 22 and/or a second air distribution assembly 30 that is connected to and/or integrated with a seat back 24.

The instant disclosure includes the following non-limiting embodiments:

1. An air deflector, comprising a base; an aperture extending through the base; and a plurality of fins extending across the aperture.
2. The air deflector according to embodiment 1, wherein the fins are fixed relative to the base.
3. The air deflector according to any preceding embodiment, wherein the plurality of fins includes at least three fins.
4. The air deflector according to any preceding embodiment, wherein the plurality of fins includes at least one curved fin having a circumferential extent of 50 to 70 degrees and/or at least one angled fin having a portion disposed at an angle of 50 to 70 degrees relative to the base.
5. The air deflector according to any preceding embodiment, wherein the plurality of fins includes a first fin and a second fin; and the second fin is longer than the first fin.
6. The air deflector according to any preceding embodiment, wherein the first fin is disposed radially outward from the second fin.
7. The air deflector according to any preceding embodiment, wherein the plurality of fins includes a third fin and a fourth fin; and the third fin is disposed radially outward from the fourth fin.
8. The air deflector according to any preceding embodiment, wherein the first fin and the second fin are disposed at a first half of the aperture; and the third fin and the fourth fin are disposed at a second half of the aperture.

9. The air deflector according to any preceding embodiment, wherein the base includes a first side and a second side; and the plurality of fins are disposed at or beyond the first side.
10. The air deflector according to any preceding embodiment, wherein the base includes a tube portion extending from the second side; and the tube portion is centered with the aperture.
11. The air deflector according to any preceding embodiment, wherein the plurality of fins are not disposed in the tube portion.
12. The air deflector according to any preceding embodiment, wherein the base includes a flange extending around the aperture from the first side of the base.
13. The air deflector according to any preceding embodiment, wherein the plurality of fins extend beyond the flange.
14. The air deflector according to any preceding embodiment, wherein the flange includes recesses aligned with a first fin of the plurality of fins.
15. The air deflector according to any preceding embodiment, wherein the plurality of fins include planar straight portions that are parallel to each other.
16. The air deflector according to any preceding embodiment, wherein the plurality of fins include angled or curved portions extending from the planar straight portions.
17. A vehicle seat, comprising: the air deflector according to any preceding embodiment; an air mover; a duct connected to the air mover and a tube portion of the air deflector; and an air distributor in fluid communication with the aperture.
18. The vehicle seat of according to embodiment 17, wherein the air deflector includes a flange that extends toward the air distributor and does not extend into the air distributor.
19. The vehicle seat according to embodiment 17 or 18, wherein at least some of the plurality of fins extend into the air distributor.
20. The vehicle seat according to embodiment 17, 18, or 19, including a cushion; wherein the air distributor is disposed at least partially in the cushion.

In examples, an ECU (e.g., ECU 100) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, left-ward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. An air deflector, comprising:
   a base comprising:
       a flange that extends from a first side of the base, the flange comprising:
           a first recess and a second recess disposed opposite to each other;
       an aperture extending through the base; and
   a plurality of fins extending across the aperture, wherein the plurality of the fins extends from the first side of the base and the plurality of the fins are aligned with at least the first recess and the second recess to facilitate an air flow into and out of at least a portion of the aperture between the plurality of the fins and the flange of the air deflector.

2. The air deflector of claim 1, wherein the plurality of fins is fixed relative to the base, and the flange extends in a direction that is parallel to at least a portion of each of the plurality of fins.

3. The air deflector of claim 1, wherein the plurality of fins includes at least three fins.

4. The air deflector of claim 1, wherein the plurality of fins includes at least one of a curved fin comprising a circumferential extent of 50 to 70 degrees and an angled fin comprising a portion disposed at an angle of 50 to 70 degrees relative to the base.

5. The air deflector of claim 1, wherein the plurality of fins includes a first fin and a second fin; and
   the second fin is longer than the first fin.

6. The air deflector of claim 5, wherein the first fin is disposed radially outward from the second fin.

7. The air deflector of claim 6, wherein the plurality of fins includes a third fin and a fourth fin; and the third fin is disposed radially outward from the fourth fin.

8. The air deflector of claim 7, wherein the first fin and the second fin are disposed at a first half of the aperture; and the third fin and the fourth fin are disposed at a second half of the aperture.

9. The air deflector of claim 1, wherein the base further comprises a lip, the first side, and a second side, and wherein the lip is aligned with the first side of the base, the plurality of fins extends from the lip, such that a first end and a second end of a bottom edge of each fin is connected to respective portions of the lip.

10. The air deflector of claim 9, wherein the base further comprises a tube portion extending from the second side, and the tube portion is centered with the aperture, and wherein the plurality of fins is disposed outside the tube portion.

11. The air deflector of claim 1, wherein the plurality of fins extends beyond the flange.

12. The air deflector of claim 1, wherein the plurality of fins includes at least one of planar straight portions that are parallel to each other, and one of angled or curved portions extending from the planar straight portions, and wherein the planar straight portions are perpendicular to a plane of the base.

13. A vehicle seat, comprising:
the air deflector of claim 1;
an air mover;
a duct connected to the air mover and a tube portion of the air deflector; and
an air distributor in fluid communication with the aperture.

14. The vehicle seat of claim 13, wherein the air deflector includes a flange that extends toward the air distributor and does not extend into the air distributor.

15. The vehicle seat of claim 14, wherein at least some of the plurality of fins extend into the air distributor.

16. The vehicle seat of claim 13, further comprising a seat cushion, wherein the air distributor is disposed at least partially in the cushion.

17. The vehicle seat of claim 14, wherein the first recess and the second recess correspond to at least a portion of the flange with a length that is smaller than a length of another portion of the flange.

18. The vehicle seat of claim 14, wherein the plurality of fins comprises a first fin and a second fin, such that the second fin is longer than the first fin and disposed radially inward from the first fin, wherein each of the plurality of fins comprises a planar straight portion and one of angled or curved portion extending from the planar straight portion, and wherein a first planar straight portion associated with the first fin is parallel to a second planar straight portion associated with the second fin and a first angled or curved portion associated with the first fin is parallel to a second angled or curved portion associated with the second fin.

19. A vehicle seat, comprising:
an air mover;
a duct in fluid communication with the air mover;
an air distribution assembly in fluid communication with the air mover via the duct, wherein the air distribution assembly comprises:
an air deflector comprising:
a base comprising:
a flange that extends from a first side of the base, the flange comprising a first recess and a second recess disposed opposite to each other;
an aperture extending through the base; and
a plurality of fins extending from the first side of the base and the plurality of the fins are aligned with at least the first recess and the second recess to facilitate an air flow into and out of at least a portion of the aperture between the plurality of the fins and the flange of the air deflector; and
an air distributor in fluid communication with the aperture to facilitate the air flow at a surface of a cushion of the vehicle seat; and
an electronic control unit configured to control an operation the air distribution assembly.

20. An air distribution system for a vehicle seat, comprising:
an air mover configured to generate air flow;
a duct in fluid communication with the air mover;
an air deflector connected to the duct, the air deflector comprises:
a base comprising:
a flange that extends from a first side of the base, the flange comprising:
a first recess and a second recess disposed opposite to each other;
an aperture extending through the base; and
a plurality of fins extending from the first side of the base and aligned with at least the first recess and the second recess to facilitate an air flow into and out of at least a portion of the aperture between the plurality of the fins and the flange; and
a tube portion centred with the aperture and in fluid communication with the duct; and
an air distributor in fluid communication with the aperture to facilitate the air flow within the vehicle seat.

* * * * *